May 10, 1927.
L. R. SCOTT
1,628,200
WINDSHIELD WING MOUNTING
Filed April 28, 1924    2 Sheets-Sheet 2
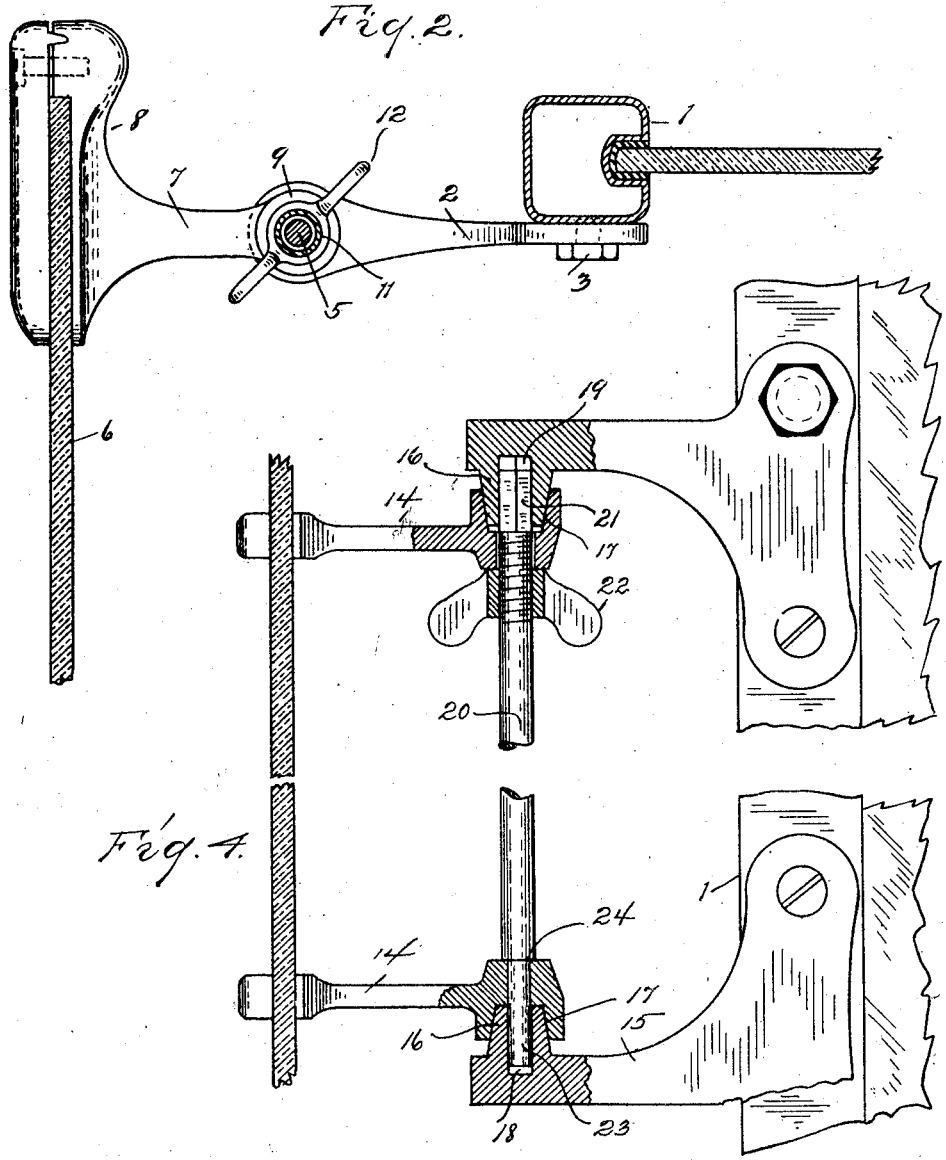

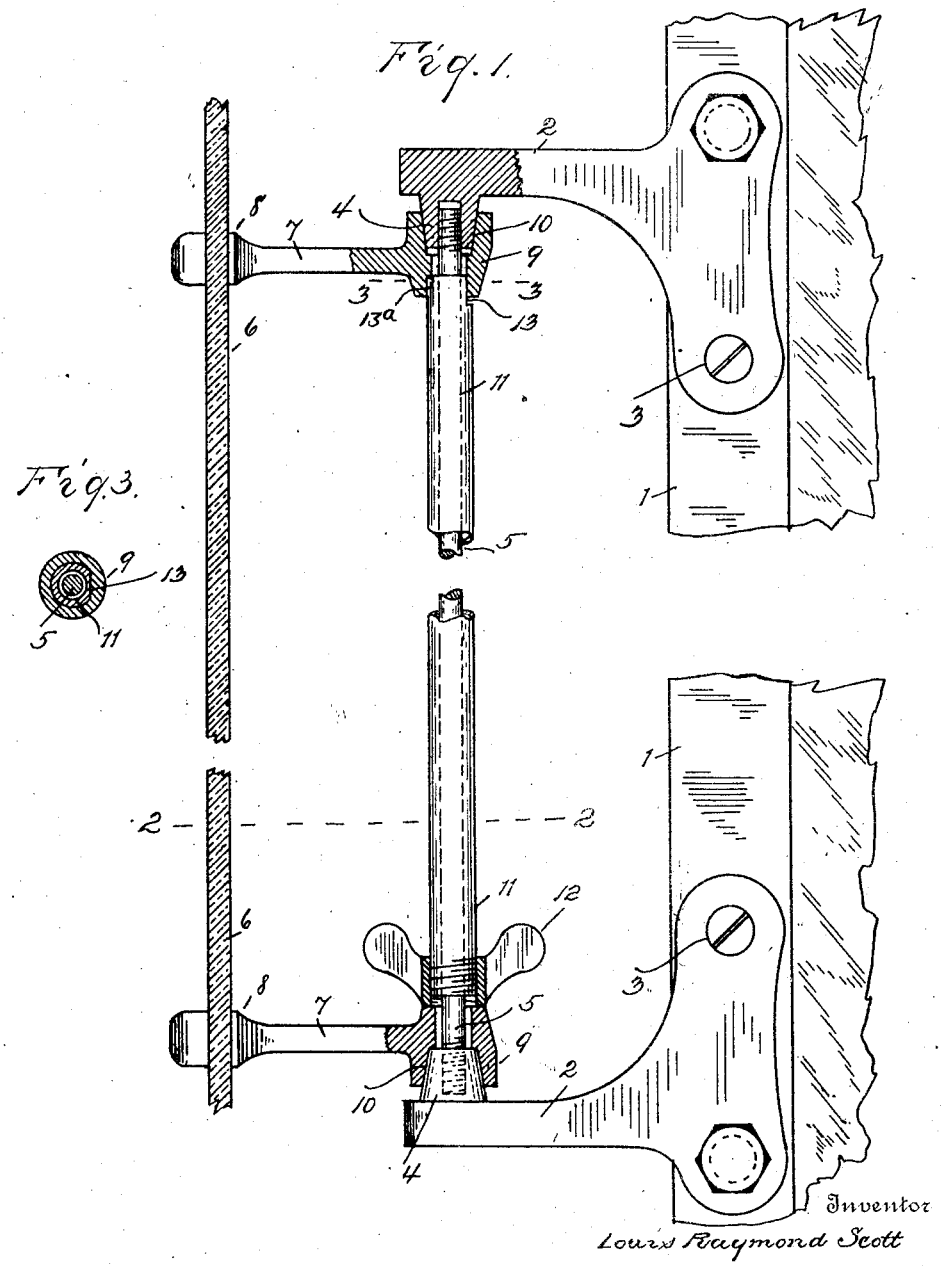

Patented May 10, 1927.

1,628,200

UNITED STATES PATENT OFFICE.

LOUIS RAYMOND SCOTT, OF TORONTO, ONTARIO, CANADA, ASSIGNOR TO GEORGE L. MITCHELL, OF DETROIT, MICHIGAN.

WINDSHIELD-WING MOUNTING.

Application filed April 28, 1924. Serial No. 709,582.

This invention relates to windshield wings and relates particularly to mountings for such wings. The invention consists in the structural features and arrangement of parts hereinafter set forth.

In the drawings:—

Figure 1 is a view in elevation showing the improved mounting employed to attach a wing or deflector to a windshield frame;

Figure 2 is a cross section taken on line 2—2 of Figure 1;

Figure 3 is a sectional detail view on line 3—3 of Figure 1;

Figure 4 is a view similar to Figure 1 but showing an alternative construction.

In these views the reference character 1 desigates a windshield standard or some other portion of a vehicle forming a support for a pair of upper and lower spaced bracket arms 2. Screws 3 or the like are employed to rigidly fasten said arms to said standard. The arms 2 project similarly in a transverse relation to the standard, and the free ends of said arms have integral conical bearing members 4 projecting toward each other. 5 is a metal rod, the extremities of which are screw threaded axially into said bearing members.

A windshield wing or deflector is formed by a glass plate 6 and a pair of spaced supporting brackets 7 are provided at corresponding ends with clamps 8 engaging said plate. The other ends of the brackets 7 are formed with integral bearing portions 9 having conical openings 10 wherein the bearing members 4 engage. 11 is a sleeve enclosing the rod 5 and extending between the brackets 7. One end of said sleeve is screw threaded and is engaged by a wing nut 12, and the other end of the sleeve is planed off upon one side as indicated at 13 and engages in a corresponding opening in the adjacent bracket 7 whereby said sleeve and bracket are restrained from relative rotation.

In the use of the described construction, the deflector 6 and its supporting bracket 7 may swing about the axis of the bearings 4 and 9 when said bearings are not clamped firmly against each other. After the operator has established the desired position of said wing, the wing nut 12 is turned in a direction to feed the sleeve 11 upwardly against the upper arm 2, while said nut is forced in the opposite direction. Thus, at the same time, the conical bearing members 4 and 9 above and below said rod are thrust into firm clamping engagement, whereby the brackets 7 and consequently the wing 6 are held fixed relative to the arms 2 and standard 1. By a turn or two of the wing nut 12 in the opposite direction this clamping stress may be relieved whenever further angular adjustment of the deflector 6 is desired.

The prevention of relative rotation between the upper end of the sleeve 11 and the adjacent bracket 7, as is best shown in Figure 3, is important in that otherwise said sleeve would be likely to turn with the nut 12 instead of being fed into or out of said nut through rotation of the latter.

In the alternative construction shown in Figure 4 the deflector supporting brackets are indicated at 14 and the arms fixed upon the windshield standard at 15. As in the first-described construction, conical bearing members 16 project toward each other from the free ends of the arms 15 and engage in conical openings 17 formed in the brackets 14. In this embodiment of the invention, however, the previously described sleeve is eliminated. In one of the bearing members 16 there is formed a cylindrical socket 18, and the other is formed with a polygonal socket 19. A rod 20 has at one end a polygonal portion 21 engaging in the socket 19 and held from rotation by such engagement. Adjacent to said portion 21 said rod is threaded for engagement by a wing-nut 22 which bears against the adjacent bracket member 14. At its other end the rod 20 has a reduced cylindrical portion 23 fitting into the socket 23 and the main body of said rod bearing upon the adjacent bracket arm 14.

When the wing-nut 22 is turned to feed it further on to the rod 20, the bracket arms 14 are relieved of clamping stress, and said arms, together with the deflector which they support, may be swung about the axis of the rod 20 to any desired position. In order to maintain such position, the wing-nut 22 is given one or two turns in a direction to feed the same toward the adjacent end of the rod 20, whereby the shoulder 24 and said wing-nut clamp the bracket arms 14 rigidly upon the conical bearing members 16. Engagement of the polygonal end 21 of the rod 20 in the correspondingly shaped socket 19 prevents rotation of said rod and consequently insures the desired longitudinal shifting of the rod responsive to rotation of the nut 22.

What I claim as my invention is:—

1. In a device of the character described, the combination with a pair of spaced carrier brackets, and means connecting said brackets in a fixed spaced relation, of a pair of supporting brackets seating respectively upon said carrier brackets between the latter, a compression member extending between the two supporting brackets and seating at one end against one thereof, and a nut threaded upon the other end of said compression member and bearing upon the other supporting bracket, one end of said compression member having a flat lateral face engaging a corresponding face of the adjacent supporting bracket to restrain said compression member and bracket from relative rotation.

2. In a device of the character described, the combination with a pair of spaced carrier brackets, of means connecting said brackets in a fixed spaced relation, conical bearing members upon said carrier brackets projecting toward each other, a deflector, a pair of spaced brackets engaging and supporting said deflector and having portions arranged between said carrier brackets formed with conical openings receiving said conical bearing members, a compression member extending between the two supporting brackets and seating at one end against one of said supporting brackets, and means upon the other end of said compression member engaging the other supporting bracket, one end of said compression member having a flat lateral face engaging a corresponding face of the adjacent supporting bracket to restrain said compressor member and bracket from relative rotation.

In testimony whereof I affix my signature.

LOUIS RAYMOND SCOTT.